(12) United States Patent
Hsu et al.

(10) Patent No.: US 12,726,459 B2
(45) Date of Patent: Sep. 1, 2026

(54) METHOD FOR INTER-INTEGRATED CIRCUIT (I2C) ADDRESS ALLOCATION

(71) Applicant: Prolific Technology Inc., Taipei City (TW)

(72) Inventors: Chia-Chang Hsu, Hsinchu County (TW); Wei-Shu Hsu, Hsinchu County (TW); Ren-Yuan Yu, Hsinchu County (TW)

(73) Assignee: Prolific Technology Inc., Taipei City (TW)

( * ) Notice: Subject to any disclaimer, the term of this patent is extended or adjusted under 35 U.S.C. 154(b) by 76 days.

(21) Appl. No.: 18/912,620

(22) Filed: Oct. 11, 2024

(65) Prior Publication Data

US 2026/0075033 A1 Mar. 12, 2026

(30) Foreign Application Priority Data

Sep. 12, 2024 (TW) ................................ 113134556

(51) Int. Cl.
*H04L 61/5038* (2022.01)
*G06F 13/42* (2006.01)

(52) U.S. Cl.
CPC ...... *H04L 61/5038* (2022.05); *G06F 13/4282* (2013.01); *G06F 2213/0016* (2013.01)

(58) Field of Classification Search
CPC ............................... G06F 1/08; H04L 43/0847
See application file for complete search history.

(56) References Cited

U.S. PATENT DOCUMENTS

| | | | | |
|---|---|---|---|---|
| 11,895,353 | B2 * | 2/2024 | Yoshizawa | H04N 11/06 |
| 12,132,810 | B2 * | 10/2024 | Brouse | H04L 69/14 |
| 12,298,929 | B2 * | 5/2025 | Shin | G06F 13/4282 |
| 2006/0200605 | A1 | 9/2006 | Hatamori | |
| 2015/0363353 | A1 * | 12/2015 | Enami | G06F 1/08 710/110 |
| 2017/0104655 | A1 * | 4/2017 | Takahashi | H04L 43/0847 |
| 2018/0025604 | A1 * | 1/2018 | Protopsaltis | B60N 2/0035 340/457 |
| 2021/0165692 | A1 * | 6/2021 | Zhou | G06Q 30/0255 |
| 2021/0320783 | A1 * | 10/2021 | Masuda | H04L 7/0012 |
| 2024/0160599 | A1 * | 5/2024 | Yang | G06F 13/4286 |

FOREIGN PATENT DOCUMENTS

| | | |
|---|---|---|
| CN | 117194303 A | 12/2023 |
| TW | I255991 | 6/2006 |
| TW | 202429299 A | 7/2024 |

* cited by examiner

*Primary Examiner* — Getente A Yimer
(74) *Attorney, Agent, or Firm* — Winston Hsu

(57) ABSTRACT

A method for inter-intergrated circuit (I2C) address allocation includes the master device sending a notification signal to the plurality of slave devices via the bus, and after one of the plurality of slave devices receives the notification signal, the slave device generating a delay period, and detecting the serial data (SDA) signal of the, if not detecting the SDA signal having a high to low signal transition, at the end of the delay period the slave device updating the identification of the slave device, outputting low-pulse signal from the SDA pin and maintaining a low-pulse period, at the end of the low-pulse period, pulling the SDA signal to high, and detecting the SDA pins.

20 Claims, 6 Drawing Sheets

METHOD FOR INTER-INTEGRATED CIRCUIT (I2C) ADDRESS ALLOCATION

BACKGROUND OF THE INVENTION

1. Field of the Invention

The present invention relates to the field of electronic communication systems, specifically addressing the Inter-Integrated Circuit (I2C) bus technology.

2. Description of the Prior Art

Modern electronic devices use a variety of bus systems for communication. Most bus systems and transmission protocols allow multiple devices to perform bidirectional data transfer, necessitating the assignment of unique communication addresses to each device. Among these bus systems and networks, Ethernet is perhaps the most well-known. In Ethernet networks, communication devices require both MAC addresses and IP addresses. While MAC addresses are fixed for each device, IP addresses are typically allocated dynamically.

Another significant bus system is the inter-integrated circuit (I2C) bus, a serial communication protocol designed for connecting low-speed peripheral devices to motherboards, mobile phones, and embedded systems. I2C finds application in various control architectures, including System Management Bus (SMBus), Power Management Bus (PMBus), Intelligent Platform Management Interface (IPMI), Display Data Channel (DDC), and Advanced Telecom Computing Architecture (ATCA). I2C traditionally employs a 7-bit address space, reserving 16 addresses, which allows communication with up to 112 nodes on a single bus. Standard I2C buses operate at different speeds: standard mode (100 Kbit/s) and low-speed mode (10 Kbit/s). Notably, the clock frequency can drop to zero, effectively pausing communication when needed.

Newer generations of I2C buses offer expanded capabilities, supporting a 10-bit address space for more nodes and faster communication modes (400 Kbit/s and 3.4 Mbit/s). Historically, when multiple devices on an I2C system share the same address, solutions include adding data multiplexers to increase channel numbers or using hardware-based General-purpose input/output (GPIO) pins to allocate I2C device addresses. However, limitations in available GPIO pins can constrain I2C address configurations. Consequently, there is a need for novel address configuration methods to overcome these challenges and enhance the flexibility of I2C systems.

SUMMARY OF THE INVENTION

An embodiment provides a method for Inter-Integrated Circuit (I2C) bus address allocation in an I2C bus system. The system comprises a master device, a plurality of slave devices, and a bus. The master device and the plurality of slave devices are coupled to the bus. The method comprises outputting a notification signal, by the master device, to the plurality of slave devices via the bus, when a slave device of the plurality of slave devices receives the notification signal, setting a Serial Data Line (SDA) pin of the slave device to a receive mode, generating, by the slave device, a delay period, detecting a pin signal of the SDA pin by the slave device during the delay period, if no high-to-low transition is detected on the SDA pin during the delay period, updating a device identifier (ID) of the slave device and switching the SDA pin to an output mode at the end of the delay period, outputting, by the SDA pin, a low-level pulse for a low-level period, pulling the low-level pulse at the SDA pin to a high-level at the end of the low-level period, switching the SDA pin back to the receive mode, and detecting a signal on the SDA.

An embodiment provides another method for Inter-Integrated Circuit (I2C) bus address allocation in an I2C bus system. The system comprises a master device, a plurality of slave devices, and a bus. The master device and the plurality of slave devices are coupled to the bus. The method comprises outputting a notification signal, by the master device, to the plurality of slave devices via the bus, when a slave device of the plurality of slave devices receives the notification signal, setting a Serial Data Line (SDA) pin of the slave device to a receive mode, generating, by the slave device, a delay period, detecting a pin signal of the SDA pin by the slave device during the delay period, updating a device identifier (ID) of the slave device according to the pin signal during the delay period, if at the end of the delay period, the pin signal of the SDA is at a high level, updating a device ID of the slave device and switching the SDA pin to an output mode, outputting, by the SDA pin, a low-level pulse for a low-level period, pulling the low-level pulse at the SDA pin to a high-level at the end of the low-level period, switching the SDA pin back to the receive mode, and detecting a signal on the SDA.

An embodiment provides another method for Inter-Integrated Circuit (I2C) bus address allocation in an I2C bus system. The system comprises a master device, a plurality of slave devices, and a bus. The master device and the plurality of slave devices are coupled to the bus. The method comprises outputting, by the master device, a notification signal to the plurality of slave devices via the bus, when a slave device of the plurality of slave devices receives the notification signal, setting a Serial Data Line (SDA) pin of the slave device to a receive mode, generating a delay period by the slave device, detecting a pin signal of the SDA pin by the slave device during the delay period, updating a device identifier (ID) of the slave device according to the pin signal during the delay period, if the pin signal is at a low level at the end of the delay period, generating another delay period by the slave device, and detecting, by the slave device, the pin signal during the another delay period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
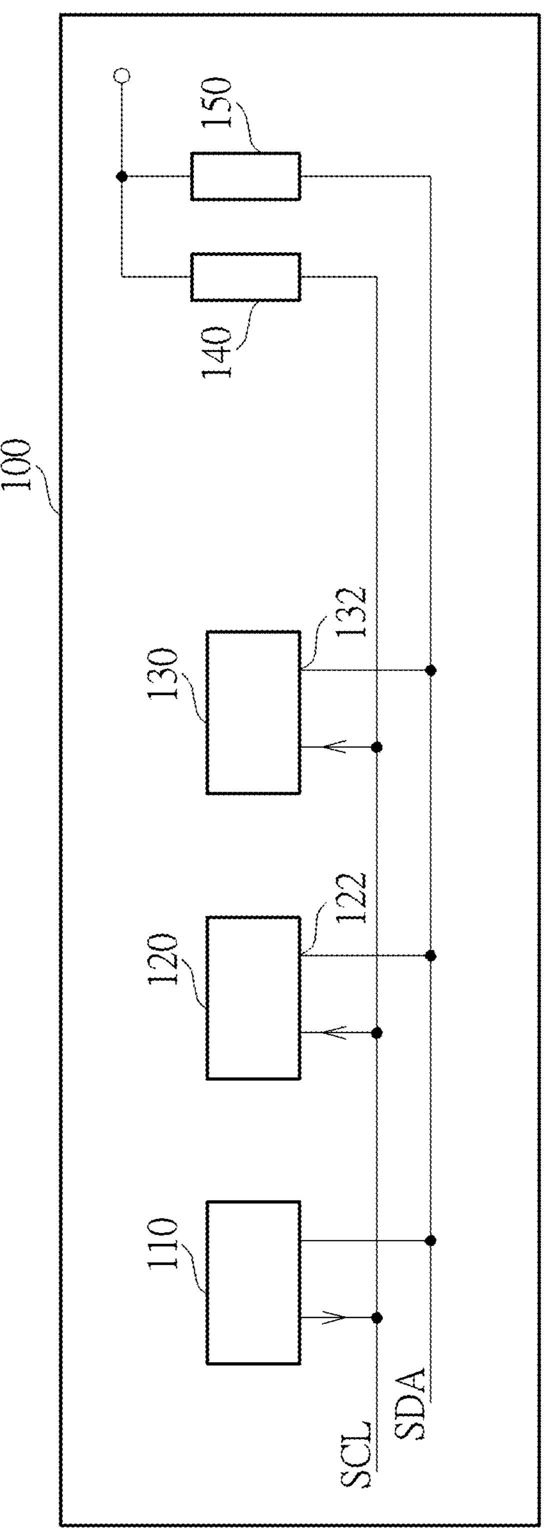
FIG. 1 illustrates the architecture of the I2C system according to an embodiment.

FIG. 1 illustrates the architecture of the Inter-Integrated Circuit (I2C) system 100 according to an embodiment. The I2C bus system 100 comprises a master device 110, slave devices 120 and 130, and resistors 140 and 150. It uses two bidirectional open-drain lines: the Serial Data Line (SDA) for transmitting data and address signals, and the Serial Clock Line (SCL) for clock signals. When activated, both SDA and SCL are at low level; when deactivated, both SDA and SCL are floating. Resistors 140 and 150 pull up the voltage, typically with a 5V operating voltage and 1.8 kΩ resistance. The bus employs a wired-AND configuration, meaning no signal modulation occurs on SDA when SCL is high. The master device 110 initiates and terminates transmissions and generates clock signals, while slave devices 120 and 130 receive clock signals and respond to the transmissions of the master device 110. Each device on the bus has a unique address and operates in a master/slave relationship, with the master device 110 capable of acting as either transmitter or receiver.

Figure 2:
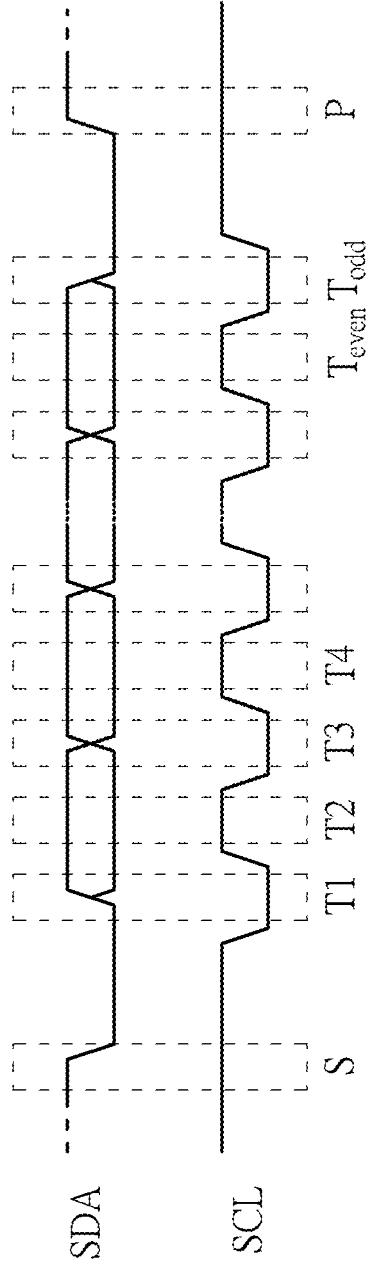
FIG. 2 illustrates the operational signals of the I2C bus system of FIG. 1.

FIG. 2 illustrates the operational signals of the I2C bus system 100, detailing the communication process. The data transmission sequence begins with a start period S, characterized by SDA being pulled low while SCL remains high. This is followed by alternating periods of data setting and reading. During odd-numbered periods (T1, T3, $T_{odd}$, etc.), when SCL is low, the SDA line sets data bits. In even-numbered periods (T2, T4, $T_{even}$, etc.), when SCL rises to high, the devices read the data on SDA. This alternating pattern continues throughout the data transmission. The sequence concludes with an end period P, signaled by SDA being pulled high while SCL is high. In essence, the communication process follows these steps: the master device 110 initiates communication with a start signal, causing slave devices 120 and 130 to enter receive mode. The master device 110 then transmits the target device address and read/write information, setting the stage for subsequent data exchange.

Figure 3:
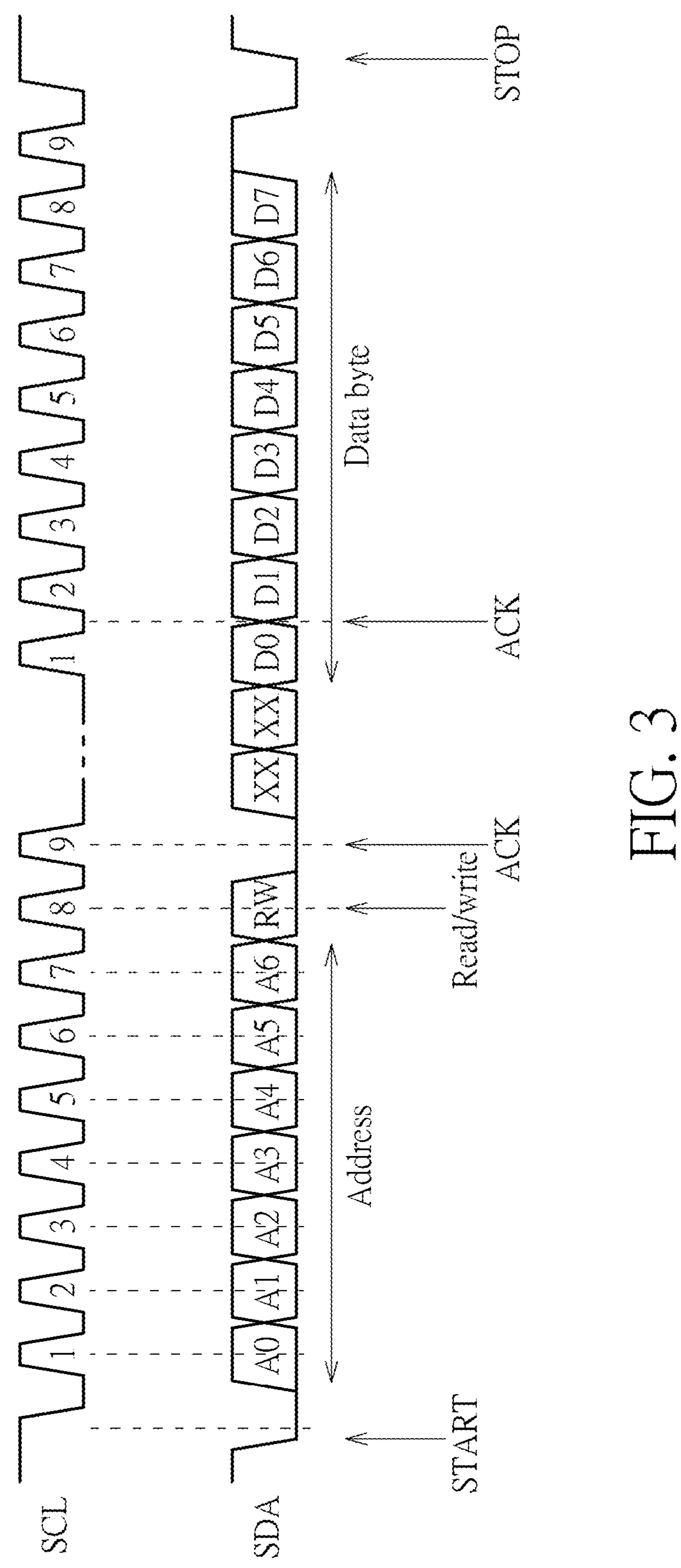
FIG. 3 depicts the transmission signal and packet structure for in the I2C bus system of FIG. 1.

FIG. 3 Illustrates the Transmission Signal and Packet structure for the 7-bit address mode in the I2C bus system 100. In some embodiments, the I2C bus system 100 can also supports a 10-bit mode. The packet structure begins with a 7-bit target device address (A0 to A6), followed by a single read/write bit. Upon receiving its address, the target slave device responds with an acknowledgment bit (ACK), where ACK=0 confirms successful reception. The subsequent data transmission adheres to a specific protocol: SDA remains stable when SCL is high and only changes when SCL is low. Data is sent in byte-sized packets, each followed by an ACK bit. During the ACK bit transmission, the master releases control of the bus, and the slave device must pull SDA low to prevent a STOP or repeated START signal. Slave devices can also temporarily halt transmission between bytes by pulling SCL low. Traditionally, address conflicts in multi-device setups are resolved using data multiplexers or hardware-based General-purpose input/output (GPIO) for address allocation. However, this embodiment introduces a novel approach by assigning unique device identifiers to each slave device, eliminating the need for additional hardware.

Figure 4A:
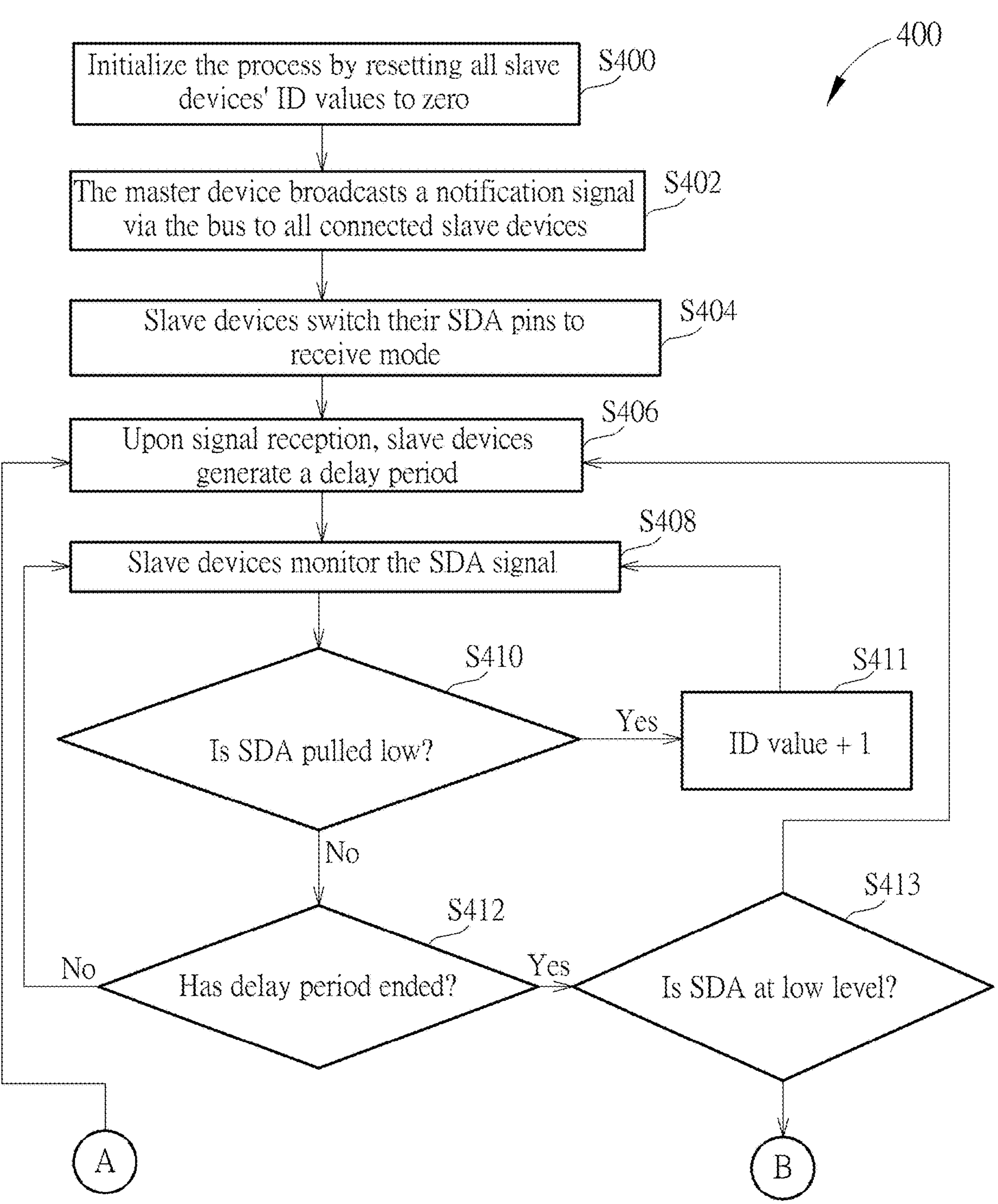
FIGS. 4A and 4B are a flowchart illustrating the address configuration method for the I2C bus system of FIG. 1.
Figure 4B:
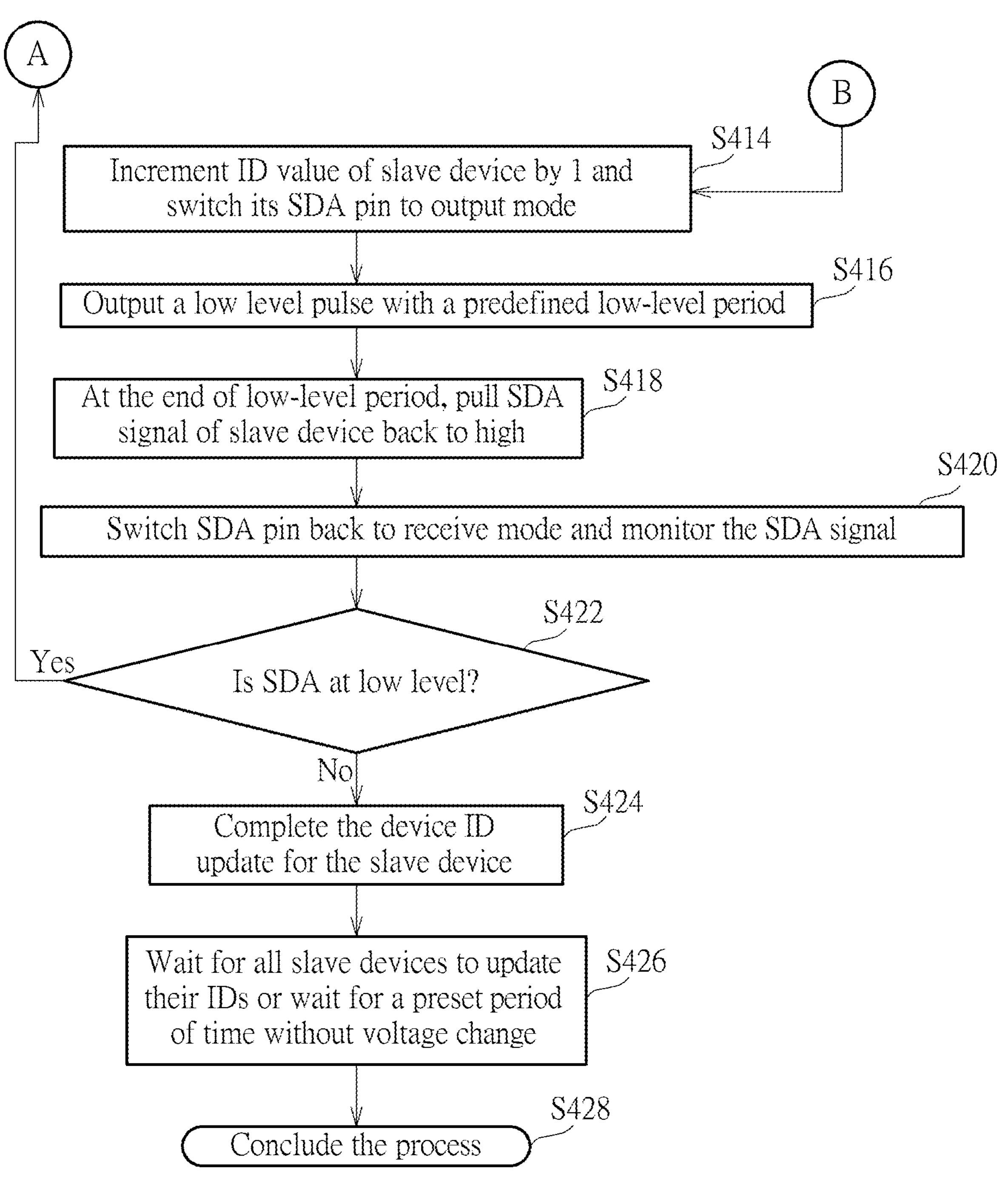

FIGS. 4A and 4B are a flowchart illustrating the address configuration method 400 for the I2C bus system 100. The method 400 comprises the following steps:

- S400: Initialize the process by resetting all slave devices' (120, 130) ID values to zero;
- S402: The master device 110 broadcasts a notification signal via the bus to all connected slave devices;
- S404: Slave devices 120 and 130 switch their SDA pins 122 and 132 to receive mode;
- S406: Upon signal reception, slave devices generate a delay period;

- S408: During the delay period, slave devices (e.g., slave device 120) monitor the SDA signal;
- S410: If slave device 120 detects SDA pulled low, proceed to S411; otherwise, go to S412;
- S411: Increment ID value of slave device 120 by 1, then return to S408;
- S412: Check if delay period of slave device 120 has ended; if so, go to S413; if not, return to S408;
- S413: If slave device 120 detects SDA at low level, return to S406; otherwise, proceed to S414;
- S414: Increment identifier value of slave device 120 by 1 and switch its SDA pin 122 to output mode;
- S416: Output a low level pulse with a predefined low-level period;
- S418: At the end of low-level period, pull SDA signal of slave device 120 back to high;
- S420: Switch SDA pin 122 of slave device 120 back to receive mode and monitor the SDA signal;
- S422: If slave device 120 detects SDA at low level, return to S406; otherwise, proceed to S424;
- S424: Complete the device ID update for slave device 120;
- S426: Wait for all slave devices to update their IDs or wait for a preset period of time without voltage change;
- S428: Conclude the process.

This sequence of operations, while illustrated using slave device 120 as an example, is applicable in the same manner to slave device 130 and any other slave devices connected to the I2C bus system.

Figure 5:
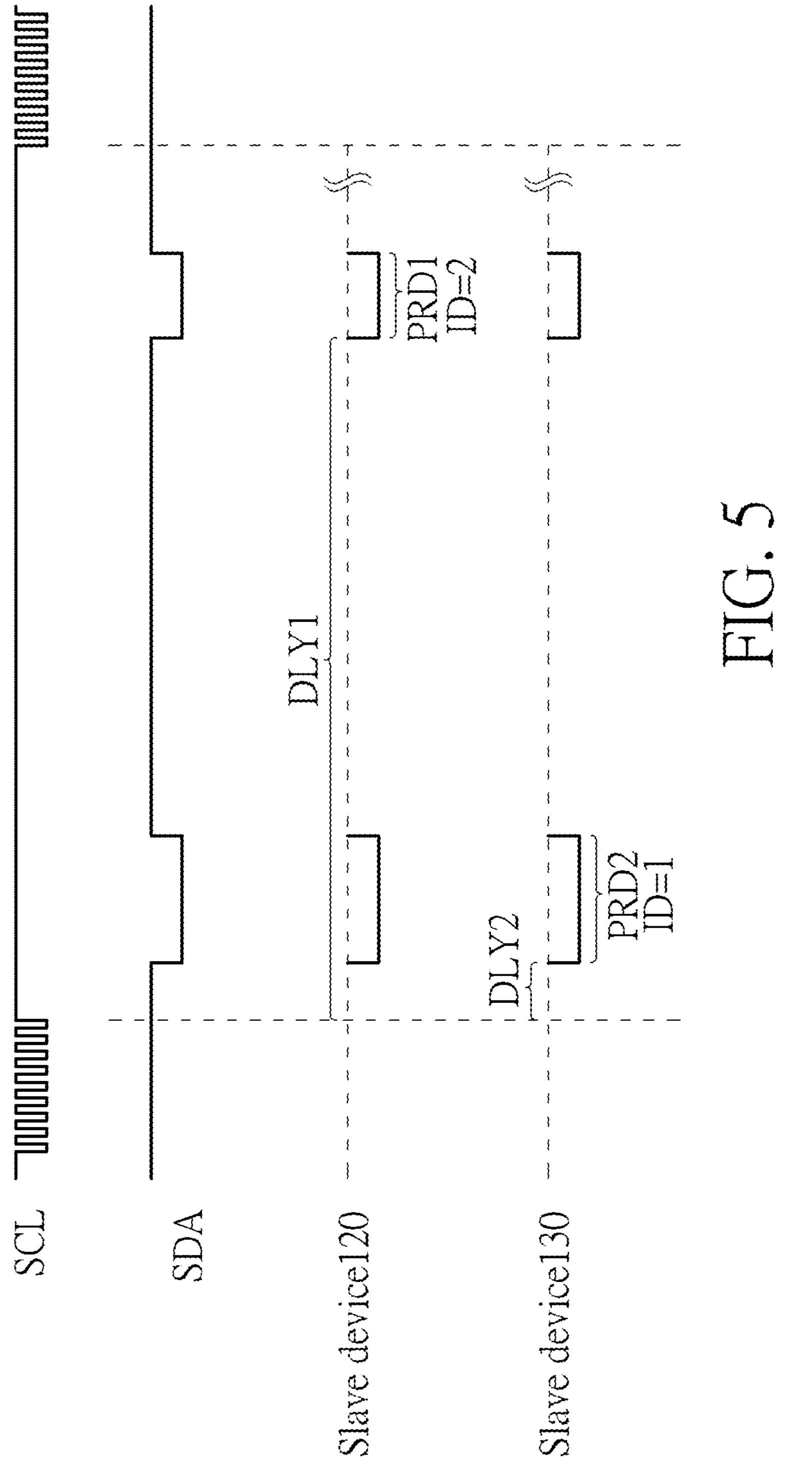
FIG. 5 illustrates the signal diagram for the address configuration method of FIGS. 4A and 4B.

FIG. 5 illustrates the Signal Diagram for the Address configuration method 400. During the address allocation process, the SCL remains at a high level while the master device 110 issues a reallocation command. Each slave device then outputs a low level pulse at the conclusion of its individual delay period (labeled as PRD1 for device 120 and PRD2 for device 130). The system generates and updates device identifiers based on the sequence of these pulse outputs. In scenarios where delay periods are similar, the device that outputs its pulse first receives priority. If a device attempts to output when the SDA is already low, it postpones its pulse output. The method also accounts for simultaneous outputs: in such cases, devices cancel their pulses, verify the SDA status, and re-attempt output if an overlap is detected. This systematic approach guarantees unique address assignment across all devices, with the device producing the earliest pulse output receiving the lowest address number. The process effectively eliminates address conflicts without requiring additional hardware components.

Following the address configuration process, slave devices utilize their newly assigned identifiers to communicate with the master device. The communication protocol involves the master device sending packets, to which slave devices respond only if the packet's ID matches their own. These assigned device IDs are separate from the devices' hardware ID and can be updated using various methods, for example: incremental sequence, decremental sequence, or a predefined address table.

The length of delay periods, crucial to the address assignment process, can be determined through several means. These include generating random values, using product serial numbers, performing internal table lookups, employing initial register values, or other specified methods. This flexibility in determining delay periods adds to the robustness and adaptability of the address configuration system.

The above described invention introduces a method for address configuration in I2C bus systems, effectively resolving the long-standing issue of address conflicts. At its core, the innovation lies in dynamically assigning unique identifiers to each slave device, a significant departure from traditional static addressing approaches. The method offers an elegant solution to several challenges in I2C systems. Primarily, it eliminates address conflicts by ensuring each slave device possesses a distinct identifier. This is particularly crucial in systems where multiple devices might initially share the same address. By implementing this dynamic allocation, the system can accommodate a larger number of devices without the risk of communication errors due to address overlap.

A key advantage of this approach is the simplification of hardware design. Traditional methods often require additional components such as data multiplexers or dedicated GPIO pins for address allocation. This invention eliminates the need for such extra hardware, resulting in cleaner, more streamlined circuit designs. This simplification not only reduces the complexity of the system but also significantly lowers manufacturing costs, making the technology more accessible and economical to implement at scale.

The method also enhances the overall flexibility and scalability of I2C systems. With dynamic address allocation, adding or removing devices from the bus becomes a seamless process, requiring no manual reconfiguration. This feature is particularly valuable in modular systems or in applications where the number of connected devices may change over time. Furthermore, by automating the address assignment process, the likelihood of human error in manual configuration is greatly reduced, thereby improving the overall reliability of the system.

One of the most significant aspects of this invention is its universal applicability. The method can be implemented across a wide range of I2C-based systems without requiring substantial modifications to existing hardware designs. This compatibility ensures that the benefits of the invention can be readily adopted in various industries and applications, from consumer electronics to industrial control systems.

In essence, this invention represents a paradigm shift in I2C bus technology, offering a software-based solution to what has traditionally been approached as a hardware problem. It not only addresses current limitations in I2C systems but also opens up new possibilities for more complex and flexible I2C-based designs. The combination of reduced hardware complexity, increased system reliability, enhanced scalability, and cost-effectiveness positions this method as a significant advancement in the field of embedded systems and inter-device communication.

As the demand for more sophisticated and interconnected electronic systems continues to grow, innovations like this play a crucial role in enabling the next generation of smart devices and systems. By solving the fundamental issue of address conflicts in a simple yet effective manner, this invention paves the way for more robust, efficient, and versatile I2C implementations in the future.

The terminology employed in the description of the various embodiments herein h is intended for the purpose of describing particular embodiments and should not be construed as limiting. In the context of this description and the appended claims, the singular forms “a”, “an”, and “the” are intended to encompass plural forms as well, unless the context clearly indicates otherwise.

It should be understood that the term “and/or” as used herein is intended to encompass any and all possible combinations of one or more of the associated listed items. Furthermore, it should be noted that the terms “includes,” “including,” “comprises,” and/or “comprising,” when used in this specification, indicate the presence of stated features, integers, steps, operations, elements, and/or components, but do not exclude the presence or addition of one or more other features, integers, steps, operations, elements, components, and/or groups thereof.

In the context of this disclosure, the terms “coupled,” “connected,” “connecting,” “electrically connected,” and similar expressions are used interchangeably to broadly denote the state of being electrically or electronically connected. Furthermore, an entity is deemed to be in “communication” with another entity (or entities) when it electrically transmits and/or receives information signals to/from the other entity, irrespective of whether these signals contain voice information or non-voice data/control information, and regardless of the signal type (analog or digital). It is important to note that this communication can occur through either wired or wireless means. The use of these terms is intended to encompass all forms of electrical or electronic connectivity relevant to the described embodiments.

The directional terms used in the embodiments such as up, down, left, right, upper-side, down-side, in front of or behind are just the directions referring to the attached figures. Thus, the direction terms used in the present disclosure are for illustration, and are not intended to limit the scope of the present disclosure. It should be noted that the elements which are specifically described or labeled may exist in various forms for those skilled in the art.

This interpretation of terminology is provided to ensure clarity and consistency throughout the specification and claims, and should not be construed as restricting the scope of the disclosed embodiments or the appended claims.

The various illustrative components, logic, logical blocks, modules, circuits, operations and algorithm processes described in connection with the embodiments disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus utilized to implement the various illustrative components, logics, logical blocks, modules, and circuits described herein may comprise, without limitation, one or more of the following: a general-purpose single-chip or multi-chip processor, a graphics processing unit (GPU), a tensor processing unit (TPU), a neural network processing unit (NPU), a digital signal processor (DSP), an application specific integrated circuit (ASIC), a field programmable gate array (FPGA), other programmable logic devices (PLDs), discrete gate or transistor logic, discrete hardware components, any suitable combination thereof. Such hardware and apparatus shall be configured to perform the functions described herein.

A general-purpose processor may include, but is not limited to, a central processing unit microprocessor, or alternatively, any conventional processor, controller, microcontroller or state machine. In certain implementations, a processor may be realized as a combination of computing devices. Such combinations may include, for example, a DSP and a microprocessor, a plurality of microprocessors, one or more microprocessors in conjunction with a DSP core, or any other such configuration as may be suitable for the intended application.

It is to be understood that in some embodiments, particular processes, operations, or methods may be executed by circuitry specifically designed for a given function. Such function-specific circuitry may be optimized to enhance performance, efficiency, or other relevant metrics for the particular task at hand. The selection of specific hardware implementation shall be determined based on the particular requirements of the application, which may include, inter alia, performance specifications, power consumption constraints, cost considerations, and size limitations.

In certain aspects, the subject matter described herein may be implemented as software. Specifically, various functions of the disclosed components, or steps of the methods, operations, processes, or algorithms described herein, may be realized as one or more modules within one or more computer programs. These computer programs may comprise non-transitory processor-executable or computer-executable instructions, encoded on one or more tangible processor-readable or computer-readable storage media. Such instructions are configured for execution by, or to control the operation of, data processing apparatus, including the components of the devices described herein. The aforementioned storage media may include, but are not limited to, RAM, ROM, EEPROM, CD-ROM or other optical disk storage, magnetic disk storage or other magnetic storage devices, or any other medium capable of storing program code in the form of instructions or data structures. It should be understood that combinations of the above-mentioned storage media are also contemplated within the scope of computer-readable storage media for the purposes of this disclosure.

Various modifications to the embodiments described in this disclosure may be readily apparent to persons having ordinary skill in the art, and the generic principles defined herein may be applied to other embodiments without departing from the spirit or scope of this disclosure. Thus, the claims are not intended to be limited to the embodiments shown herein, but are to be accorded the widest scope consistent with this disclosure, the principles and the novel features disclosed herein.

In certain implementations, the embodiments may comprise the disclosed features and may optionally include additional features not explicitly described herein. Conversely, alternative implementations may be characterized by the substantial or complete absence of non-disclosed elements. For the avoidance of doubt, it should be understood that in some embodiments, non-disclosed elements may be intentionally omitted, either partially or entirely, without departing from the scope of the invention. Such omissions of non-disclosed elements shall not be construed as limiting the breadth of the claimed subject matter, provided that the explicitly disclosed features are present in the embodiment.

Additionally, various features that are described in this specification in the context of separate embodiments also can be implemented in combination in a single implementation. Conversely, various features that are described in the context of a single implementation also can be implemented in multiple embodiments separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

The depiction of operations in a particular sequence in the drawings should not be construed as a requirement for strict adherence to that order in practice, nor should it imply that all illustrated operations must be performed to achieve the desired results. The schematic flow diagrams may represent example processes, but it should be understood that additional, unillustrated operations may be incorporated at various points within the depicted sequence. Such additional operations may occur before, after, simultaneously with, or between any of the illustrated operations.

Additionally, it should be understood that the various figures and component diagrams presented and discussed within this document are provided for illustrative purposes only and are not drawn to scale. These visual representations are intended to facilitate understanding of the described embodiments and should not be construed as precise technical drawings or limiting the scope of the invention to the specific arrangements depicted.

In certain implementations, multitasking and parallel processing may prove advantageous. Furthermore, while various system components are described as separate entities in some embodiments, this separation should not be interpreted as mandatory for all embodiments. It is contemplated that the described program components and systems may be integrated into a single software package or distributed across multiple software packages, as dictated by the specific implementation requirements.

It should be noted that other embodiments, beyond those explicitly described, fall within the scope of the appended claims. The actions specified in the claims may, in some instances, be performed in an order different from that in which they are presented, while still achieving the desired outcomes. This flexibility in execution order is an inherent aspect of the claimed processes and should be considered within the scope of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for Inter-Integrated Circuit (I2C) bus address allocation in an I2C bus system, the system comprising a master device, a plurality of slave devices, and a bus, the master device and the plurality of slave devices being coupled to the bus, the method comprising:

outputting, by the master device, a notification signal to the plurality of slave devices via the bus;

when a slave device of the plurality of slave devices receives the notification signal, setting a Serial Data Line (SDA) pin of the slave device to a receive mode;

generating, by the slave device, a delay period;

detecting, by the slave device, a pin signal of the SDA pin during the delay period;

when no high-to-low transition is detected on the SDA pin during the delay period, updating a device identifier (ID) of the slave device and switching the SDA pin to an output mode at the end of the delay period;

outputting, by the SDA pin, a low-level pulse for a low-level period;

pulling the low-level pulse at the SDA pin to a high-level at the end of the low-level period; and switching the SDA pin back to the receive mode to continue detecting a signal on the SDA pin.

2. The method of claim 1, further comprising:

when the SDA pin is at a low level, generating, by the slave device, another delay period.

3. The method of claim 1, further comprising:

when the SDA pin is at a high level, using an updated device ID, by the slave device, to communicate with the master device, after other slave devices of the plurality of slave devices have completed updating device IDs or after a preset period during which no voltage change on the SDA pin is detected.

4. The method of claim 3, wherein using the updated device ID, by the slave device, to communicate with the master device comprises:

sending out a packet by the master device;

when the slave device receives the packet, determining whether the device ID in the packet corresponds to the updated device ID;

if the device ID in the packet corresponds to the updated device ID, responding, by the slave device, according to content of the packet.

5. The method of claim 1, further comprising setting an initial value of the device ID to 0.

6. The method of claim 1 further comprising:

recording, by the master device, a number of the plurality of slave devices according to a number of high-to-low voltage transitions on the bus after outputting the notification signal to the plurality of slave devices via the bus.

7. The method of claim 1, wherein the notification signal is a broadcast signal, a special command, a command string, or an I2C-defined general call.

8. The method of claim 1, wherein a length of the delay period is a random value, a product serial number, an internal table lookup value, or an initial register value.

9. The method of claim 1, wherein the device ID is assigned sequentially according to an incremental sequence, a decremental sequence, or a built-in address table.

10. A method for Inter-Integrated Circuit (I2C) bus address allocation in an I2C bus system, the system comprising a master device, a plurality of slave devices, and a bus, the master device and the plurality of slave devices being coupled to the bus, the method comprising:

outputting a notification signal, by the master device, to the plurality of slave devices via the bus;

when a slave device of the plurality of slave devices receives the notification signal, setting a Serial Data Line (SDA) pin of the slave device to a receive mode;

generating, by the slave device, a delay period;

detecting, by the slave device, a pin signal of the SDA pin during the delay period;

updating a device identifier (ID) of the slave device according to the pin signal during the delay period;

when the pin signal of the SDA is at a high level at the end of the delay period, updating a device ID of the slave device and switching the SDA pin to an output mode;

outputting, by the SDA pin, a low-level pulse for a low-level period;

pulling the low-level pulse at the SDA pin to a high-level at the end of the low-level period; and switching the SDA pin back to the receive mode to continue detecting a signal on the SDA pin.

11. The method of claim 10, wherein updating the device ID of the slave device according to the pin signal during the delay period comprises:

detecting high-to-low voltage pulse signal transitions on the SDA pin; and updating the device ID based on a number of the high-to-low voltage pulse signal transitions;

wherein the device ID is different from a hardware ID of the slave device.

12. The method of claim 10, further comprising:

when the SDA pin is at a low level, generating, by the slave device, another delay period.

13. The method of claim 10, further comprising:

when the SDA pin is at a high level, using an updated device ID, by the slave device, to communicate with the master device, after other slave devices of the plurality of slave devices have completed updating device IDs or after a preset period during which no voltage change on the SDA pin is detected.

14. The method of claim 13, wherein using the updated device ID, by the slave device, to communicate with the master device comprises:

sending out a packet by the master device;

when the slave device receives the packet, determining whether the device ID in the packet corresponds to the updated device ID; and if the device ID in the packet corresponds to the updated device ID, responding, by the slave device, according to content of the packet.

15. The method of claim 10, further comprising setting an initial value of the device ID to 0.

16. The method of claim 10, further comprising:

recording, by the master device, a number of the plurality of slave devices according to a number of high-to-low voltage transitions on the bus after outputting the notification signal to the plurality of slave devices via the bus.

17. A method for Inter-Integrated Circuit (I2C) bus address allocation in an I2C bus system, the system comprising a master device, a plurality of slave devices, and a bus, the master device and the plurality of slave devices being coupled to the bus, the method comprising:

outputting, by the master device, a notification signal to the plurality of slave devices via the bus;

when a slave device of the plurality of slave devices receives the notification signal, setting a Serial Data Line (SDA) pin of the slave device to a receive mode;

generating a delay period by the slave device;

detecting, by the slave device, a pin signal of the SDA pin during the delay period;

updating a device identifier (ID) of the slave device according to the pin signal during the delay period;

when the pin signal is at a low level at the end of the delay period, generating another delay period by the slave device; and detecting, by the slave device, the pin signal during the another delay period.

18. The method of claim 17, wherein updating the device ID of the slave device according to the pin signal during the delay period comprises:

detecting high-to-low voltage pulse signal transitions on the SDA pin; and updating the device ID based on a number of the high-to-low voltage pulse signal transitions;

wherein the device ID is different from a hardware ID of the slave device.

19. The method of claim 17, wherein the notification signal is a broadcast signal, a special command, a command string, or an I2C-defined general call.

20. The method of claim 17, wherein a length of the delay period is a random value, a product serial number, an internal table lookup value, or an initial register value.

* * * * *